INVENTORS
ELBERT L. TURNER
CLAUDE A. JACKMAN
BY John F. Lawler
ATTORNEY

March 18, 1969 C. A. JACKMAN ETAL 3,434,057

AUTOMATIC LOCKING RECEIVER

Filed May 2, 1966 Sheet 2 of 3

INVENTORS
ELBERT L. TURNER
CLAUDE A. JACKMAN

BY John F Lawler
ATTORNEY

*INVENTORS*
ELBERT L. TURNER
CLAUDE A. JACKMAN

BY John F. Lawler
ATTORNEY

United States Patent Office 3,434,057
Patented Mar. 18, 1969

3,434,057
AUTOMATIC LOCKING RECEIVER
Claude A. Jackman and Elbert L. Turner, San Jose, Calif., assignors to Sylvania Electric Products Inc., a corporation of Delaware
Filed May 2, 1966, Ser. No. 546,863
U.S. Cl. 325—423 3 Claims
Int. Cl. H04b 1/16, 1/36

ABSTRACT OF THE DISCLOSURE

An electrically tuned receiver employing a voltage tunable filter, having an yttrium iron garnet element, as a preselector; a backward wave oscillator to generate a local oscillator signal; and cavity-discriminator automatic frequency control techniques causing said oscillator to track said preselector so that there is no change in the difference between the output frequency of said oscillator and the midband frequency of said preselector.

This invention relates to radio frequency (RF) receivers and more particularly to an improved voltage tunable receiver.

Electronically tuned receivers desirably have a larger tuning bandwidth than mechanically tuned receivers and are more easily adaptable to remote tuning. An electronically tuned receiver may employ as a preselector for determining the frequencies of received signals that are processed by the receiver a voltage tunable filter having an yttrium iron garnet element (YIG) because YIG filters have narrowband response characteristics and therefore reduce image response and spurious signals. An example of such a receiver, which produces a constant intermediate frequency (IF) signal and employs a backward wave oscillator (BWO) to generate a local oscillator signal, is disclosed by J. G. Fitzpatrick et al., pp. 15–11 to 15–13, Proceedings, 1963 National Winter Convention on Military Electronics.

The tuning characteristics of the YIG preselector is linear, i.e., the center frequency of the preselector response characteristic is a linear function of a sweep current that is applied to the magnetization coil of the preselector. The tuning characteristic of the BWO, however, is nonlinear, i.e., the frequency of the output of the BWO is a nonlinear function of a sweep voltage that is applied to the BWO. Both sweep signals that applied to the preselector and to the BWO are varied linearly as a function of time in order to change the center frequency of the preselector response characteristic and thus tune the receiver at a linear rate.

Cavity-discriminator automatic frequency control (AFC) techniques are employed to cause the BWO to track the YIG preselector so that there is no change in the difference between the output frequency of the BWO and the midband frequency of the YIG preselector. A pair of YIG filters comprise the discriminator. As a condition to such tracking, the BWO output frequency must be within the "capture range" of the discriminator. When such a receiver is swept over a frequency band that is substantially wider than the discriminator capture range and the receiver is reset, it is difficult to maintain the BWO output frequency within the capture range such that the BWO continues to track the preselector. Also, the frequency of the output of the BWO is not always within the capture range of the discriminator when the receiver is initially turned on.

An object of this invention is the provision of a receiver that senses a deviation of the output frequency of a voltage-controlled oscillator from the capture range of a YIG discriminator and automatically shifts the oscillator output frequency into the capture range of the YIG discriminator.

Briefly, the detected outputs of the YIG filters of the discriminator are monitored by associated threshold circuits which indicate whether the operating frequency of the BWO is within the capture range of the discriminator. When the BWO output frequency is outside the capture range of the discriminator, the outputs of the threshold circuits cause a second sweep generator (which has a sweep rate that is much larger than the sweep rate of the other sweep generator which controls the rate of tuning of the preselector and the discriminator) to bias the BWO to rapidly sweep over the band of operating frequencies of the receiver. When the operating frequency of the BWO is within the capture range of the discriminator, the output of one of the threshold circuits causes the second sweep generator to be inactivated. When the second sweep generator is inoperative, the operating frequency of the BWO is controlled by the output of the YIG discriminator and the other sweep generator and the BWO tracks the center frequency of the discriminator response characteristic.

The above and other objects of this invention will appear in the following description of a preferred embodiment thereof, taken with the accompanying drawings in which:

FIGURE 3 is a set of waveforms showing circuit performance wherein;

Figure 1:
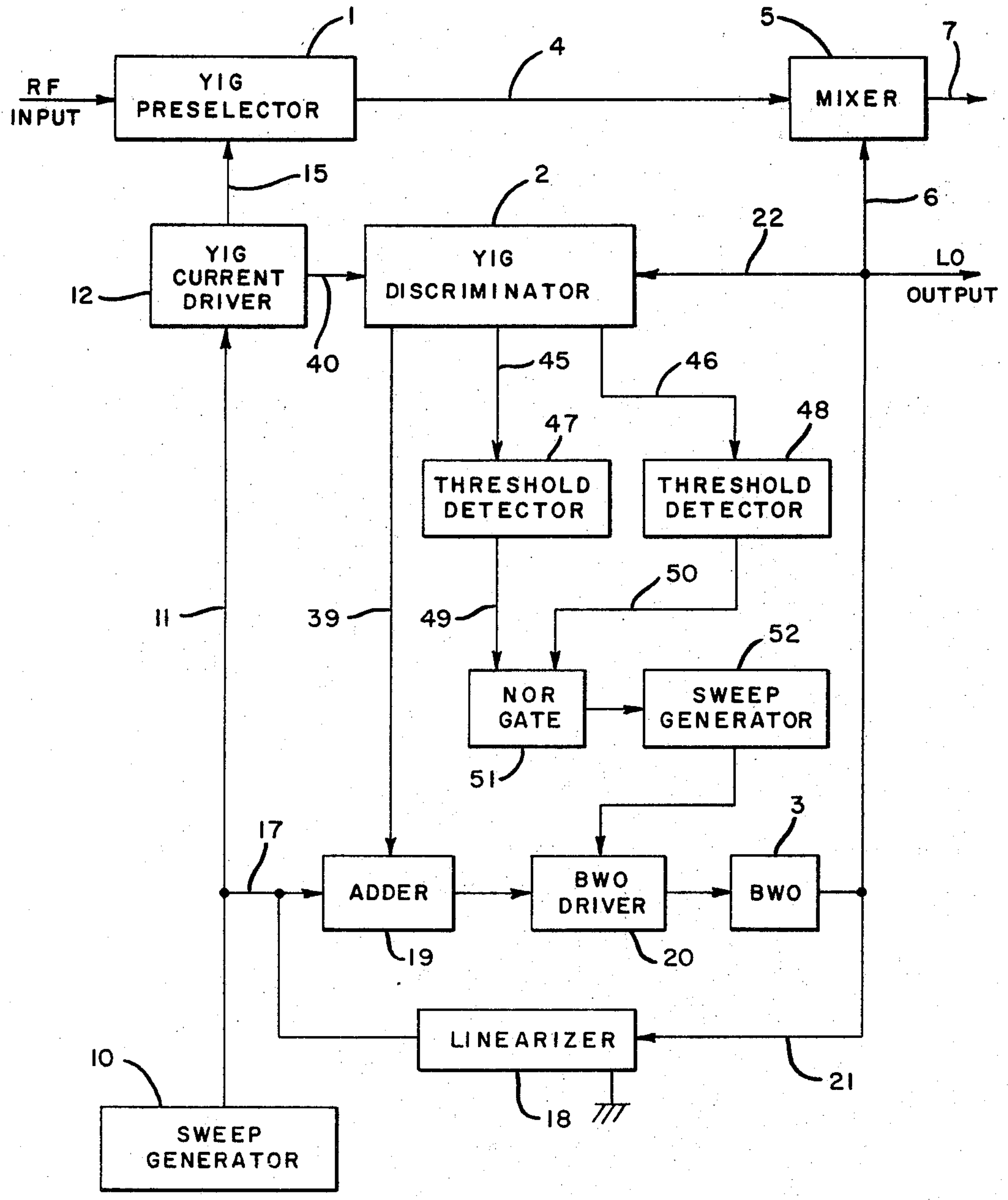
FIGURE 1 is a block diagram of the input end of a receiver embodying this invention.

Referring to FIGURE 1, a receiver embodying the invention comprises a YIG preselector 1, a YIG discriminator 2, and a BWO 3. Signals passed on line 4 by the preselector are mixed in mixer 5 with the output of the BWO on line 6. The output of the mixer on line 7 is an IF signal which has a constant frequency as is described more fully hereinafter.

Figure 2:
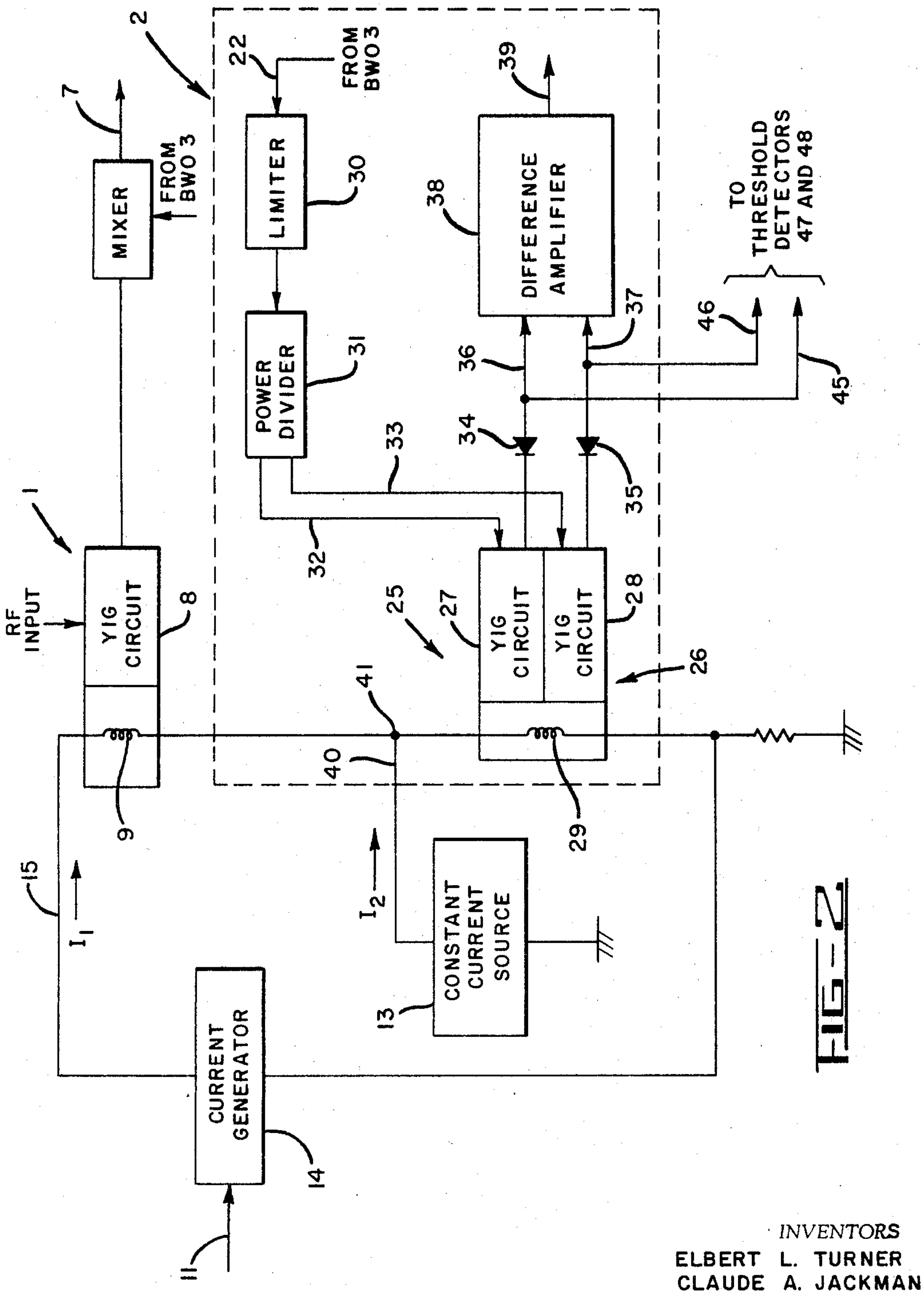
FIGURE 2 is a block diagram of the YIG discriminator and the YIG current driver of FIGURE 1.

YIG preselector 1 comprises a YIG circuit 8, see FIGURE 2, which is associated with a magnetization coil 9. Circuit 8 includes a sphere of yttrium iron garnet which is located in a transmission line.

A first sweep generator 10, see FIGURE 1, produces a sweep voltage, such as a sawtooth sweep voltage, that varies linearly as a function of time. The sweep voltage is applied on line 11 to YIG current driver 12. The current driver comprises a constant current source 13, see FIGURE 2, described hereinafter, and a current generator 14 which produces a sweep current $I_1$ that is directly proportional to the sweep voltage on line 11 from generator 10. The sweep current $I_1$ is applied on line 15 to coil 9 which generates a magnetic field to bias circuit 8 to resonance at the frequency $f_1$ and to provide the circuit with a response characteristic illustrated at 16 in FIGURE 3A. The preselector is adjusted so that this response characteristic 16 has a very narrow bandwidth, in the order of 35 MHz. Thus, the frequencies of signals passed on line 4 by the preselector are substantially equal to the resonant frequency $f_1$ of the preselector.

The resonant frequency $f_1$ is directly proportional to the magnitude of the sweep voltage produced by sweep generator 10 and therefore varies linearly from minimum to maximum limits. The sweep voltage on line 17 is shaped by linearizer 18 which bypasses a portion of the sweep voltage. The sweep voltage on line 17 is coupled through adder 19 to BWO driver 20 which controls the BWO output frequency. The output of the BWO on line 21 is applied to linearizer 18 to adjust the sweep voltage bypassed by the linearizer and thus to provide coarse linearization of the response characteristic of the BWO. Linearizer 18 may, by way of example, be a diode ladder network. The output of the BWO on line 22 is applied to discriminator 2.

The discriminator comprises a pair of YIG filters 25 and 26, see FIGURE 2, having YIG circuits 27 and 28, respectively, which are both associated with the same magnetization coil 29. Each of the circuits 27 and 28 is formed with a sphere of yttrium iron garnet located in a transmission line. The maximum amplitude of the BWO output on line 22 is controlled by limiter 30. The output of the limiter is split by power divider 31 and is applied on lines 32 and 33 to filters 25 and 26, respectively. The outputs of the filters are sensed by detectors 34 and 35 and are then applied on lines 36 and 37, respectively, to differential amplifier 38. The output of the amplifier is applied on line 39 to adder 19 where it is added to the modified output of sweep generator 10 and is applied to driver 20 to control the operating frequency of the BWO.

The constant current source 13 of YIG current driver 12 generates a constant current output $I_2$. The output of the constant current source is connected through line 40 to the junction 41 of coils 9 and 29 which are electrically connected in series. Both currents $I_1$ and $I_2$ pass through and cause coil 29 to generate a magnetic field that biases circuits 27 and 28 (and thus filters 25 and 26, respectively) so that the latter have response characteristics as illustrated by waveforms 42 and 43, respectively, (see FIGURE 3A). The YIG spheres comprising circuits 27 and 28 are oriented with respect to each other such that the response waveforms 42 and 43 are substantially identical and so that the associated resonant frequencies $f_2$ and $f_3$ are separated by a predetermined amount and are equally spaced from a prescribed frequency $f_4$. Amplifier 38 operates on the detected outputs of filters 25 and 26 so as to combine the filter response characteristics and provide a discriminator response characteristic shown by waveform 44, see FIGURE 3B.

The resonant frequency of a YIG filter is directly proportional to the signal current applied to the magnetization coil associated therewith. Thus, the linearly varying sweep current $I_1$, which passes through both coils 9 and 29, causes the center frequencies and the response characteristic 16 of the preselector and the response characteristics 42 and 43 of the filters to also vary linearly at the same rate. Since the current ($I_1$) which passes through coil 9 differs from the current ($I_1+I_2$) which passes through coil 29 by the constant current $I_2$, the resonant frequencies of the response characteristics of the YIG filters and the prescribed frequency are offset at all times from the resonant frequency of the response characteristic of the preselector by fixed amounts. The frequency $f_1$ corresponds to the frequency of received signals that are passed on line 4 by the preselector. The predetermined frequency $f_4$ corresponds to the center frequency of the discriminator response characteristic 44 and the frequency of the output of the BWO. The constant difference frequency $f_{IF}$ is equal to the frequency of the IF output of the mixer on line 7.

In accordance with this invention, the detected outputs of the filters 25 and 26 are applied on lines 45 and 46 to threshold detectors 47 and 48, respectively. Detectors 47 and 48 have threshold levels corresponding to the signal amplitude A, see FIGURE 3A. Each threshold detector produces an output when a signal applied thereto has a signal frequency that is within the pass band of the assocated filter and has a signal amplitude that is greater than or equal to the amplitude A. The signal amplitude A is the minimum signal amplitude that detectors 34 and 35 will detect. The frequencies $f_5$ and $f_6$ are the frequencies of signals passed by filters 25 and 26, respectively, that have a signal amplitude A and are separated by a maximum difference frequency from the prescribed frequency $f_4$. Thus, the difference frequency $\Delta f$ between the frequencies $f_5$ and $f_6$ defines the capture range of the YIG discriminator.

The outputs of threshold detectors 47 and 48 are applied on lines 49 and 50, respectively, to NOR gate 51. The output of the NOR gate is applied to and controls the operation of a second sweep generator 52 which produces a sawtooth sweep voltage similar to the output of sweep generator 10. The output of sweep generator 52 is applied to driver 20 which controls the operating frequency of the BWO. The sweep rate of the output of the sweep generator 52 is about 20 times greater than the sweep rate of sweep generator 10 in order to cause the BWO to sweep over the operating frequency band of the receiver at a substantially higher rate than preselector 1 sweeps over the operating frequency band of the receiver.

The following operational analysis illustrates the manner in which this invention maintains the operating frequency of the BWO equal to the predetermined frequency $f_4$ (the center frequency of the discriminator waveform 44) and causes the BWO to track the preselector.

When the receiver is initially turned on, consider that the operating frequency of the BWO is greater than the frequency $f_6$. The linearly varying sawtooth sweep voltage from sweep generator 10 causes the resonant frequency $f_1$ of the preselector and the operating frequency of the BWO to vary. The output of the discriminator on line 39, however, does not bias the BWO so that its operating frequency is equal to the predetermined frequency $f_4$ and so that the BWO tracks the preselector because the operating frequency of the BWO is outside the capture range $\Delta f$ of the discriminator.

Figure 3A:
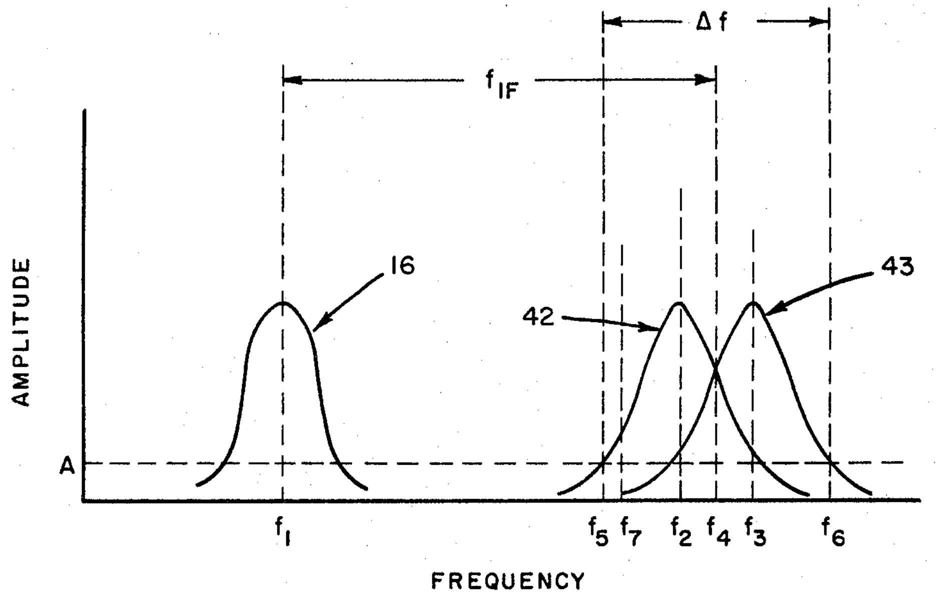
FIGURE 3A shows waves representing the response characteristics of the YIG preselector and the YIG filters of the discriminator.
Figure 3B:
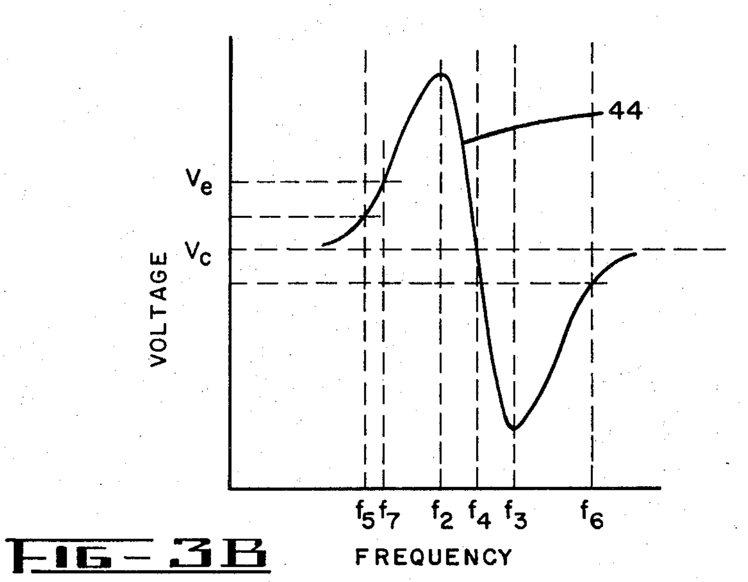
FIGURE 3B is a wave representing the response characteristic of the YIG discriminator.

The output of the BWO is applied to filters 25 and 26, see FIGURE 1. Neither filter passes the output of the BWO, however, because the operating frequency of the BWO is outside of the pass bands of the filters. Since a signal having a magnitude greater than amplitude A, see FIGURE 3A, is not passed by either filter, the magnitudes of the detected outputs thereof are less than the threshold levels of detectors 47 and 48, see FIGURE 1, and both threshold detectors are cut off. Nonconduction of the latter detectors causes NOR gate 51 to conduct to bias sweep generator 52 for generating a sweep voltage having a greater sweep rate than that of sweep generator 10. The output of sweep generator 52 biases driver 20, blocking the output of adder 19 and coupling generator 52 to the BWO. Thus, the BWO is biased to rapidly sweep over the band of operating frequencies of the receiver.

When the operating frequency of the BWO is equal to the frequency $f_7$, which may be equal to or slightly greater than the frequency $f_5$, filter 25 passes the BWO output which is within the pass band of that filter. The magnitude of the detected output of filter 25 is greater than the threshold level A, see FIGURE 3A, and therefore biases detector 47 to conduction. As detector 47 conducts, NOR gate 51 switches operating states, inactivating generator 52, and removing the output of the latter from driver 20 and the BWO. This causes the BWO driver to couple the output of adder 19 to the BWO to control the operating frequency thereof. The output of adder 19, which comprises the linearized sweep voltage from sweep generator 10 and the error voltage $V_e$, see FIGURE 3B, from the YIG discriminator, controls the operating frequency of the BWO. As a result, the operating frequency $f_7$ of the BWO is within the capture range $\Delta f$ of the discriminator and the error voltage $V_e$ biases the BWO to change the operating frequency $f_7$ thereof to be equal to the predetermined frequency $f_4$. This causes the BWO to track the YIG preselector and provides an IF output from mixer 5 which has a constant frequency.

What is claimed is:

1. An electronically-tuned receiver comprising
a first source of sweep signals having first, second, and third outputs, all of said outputs of said first source varying linearly at a first sweep rate,
a yttrium iron garnet (YIG) preselector having a first input connected to the first output of said first source, having a second input receiving incident radio frequency signals and having an output, said preselector being responsive to the first output of said first source for varying the center frequency of the preselector response characteristic,
a voltage controlled oscillator having an input and an output,
a discriminator with a discriminator response characteristic including a capture range, said discriminator having a first input connected to the second output of said first source for varying the center frequency of the discriminator response characteristic at the first sweep rate, having a second input connected to the output of said oscillator, having a first output consisting of an error signal which is proportonal to the difference in frequency between the center frequency of the discriminator response characteristic and the output frequency of said oscillator, and having a second output,
means for combining the third output of said first source and the first output of said discriminator, said combining means having an output,
means for selectively connecting the output of said combining means to the input of said oscillator for controlling the output frequency thereof,
a second source of sweep signals having an input and having an output, said second source generating a sweep signal which varies at a second sweep rate that is greater than the first sweep rate, and
threshold sensing means having a first input connected to the second output of said discriminator, having an output connected to the input of said second source, and having first and second operating states, said threshold circuit being in the first operating state when the frequency of said oscillator is within the capture range of the discriminator response characteristic and being in the second operating state when the frequency of said oscillator is outside the capture range of the discriminator response characteristic,
said second source being responsive to the output of said threshold means in said second operating state for generating the sweep signal,
said connecting means selectively connecting the sweep signal from said second source to said oscillator for shifting the frequency of the latter into the capture range of the discriminator response characteristic.

2. The receiver according to claim 1 wherein said discriminator comprises:
first and second YIG filters each having a first input connected to the output of said oscillator, each having a second input connected to the second output of said first source and each having an output,
first and second detectors each having an input connected to the respective outputs of said first and second filters and each having an output, and
wherein said threshold sensing means comprises a first threshold detector having an input connected to the output of one of said detectors.

3. The receiver according to claim 2 wherein said threshold sensing means comprises:
a second threshold detector having an input connected to the output of the other one of said detectors,
said first and second threshold detectors each having an output and each having first and second operating states, one of said threshold detectors being in said second operating state when the operating frequency of said oscillator is outside the capture range of the discriminator response characteristic, and
including gating means having first and second inputs connected to the respective outputs of said first and second threshold detectors, and having an output connected to the input of said second sweep source, said gating means being responsive to the output of the one of said threshold detectors in the second operating state for biasing said second source to generate the sweep signal.

References Cited

UNITED STATES PATENTS 3,249,876 5/1966 Harrison ---------- 325—453

WILLIAM C. COOPER, *Primary Examiner.*

BARRY PAUL SMITH, *Assistant Examiner.*

U.S. Cl. X.R.

325—335